United States Patent [19]

Somerfleck

[11] 4,436,569

[45] Mar. 13, 1984

[54] METHOD FOR FORMING A PROTECTIVE COVER FOR AIRCRAFT HAVING CONICAL RADOMES

[75] Inventor: Harold H. Somerfleck, Virginia Beach, Va.

[73] Assignee: The United States of America as represented by the Secretary of the Navy, Washington, D.C.

[21] Appl. No.: 303,802

[22] Filed: Sep. 21, 1981

[51] Int. Cl.³ .............................................. B29D 23/10
[52] U.S. Cl. .................................... 156/217; 156/218; 156/242; 156/245; 156/285; 244/1 R; 244/121
[58] Field of Search ............... 156/184, 189, 194, 217, 156/218, 242, 245, 285; 264/520, 521, 522, 523, 526, 528, 531, 534, 545, 549, 550; 343/872; 244/1 R, 121

[56] References Cited

U.S. PATENT DOCUMENTS 3,524,608  8/1970  Nicholson et al. ...................... 244/1
3,616,140 10/1971  Copeland .............................. 244/1 R
3,637,166  1/1972  Nicholson et al. .................. 244/121

FOREIGN PATENT DOCUMENTS 51-1080376  7/1976  Japan .................................. 156/218

OTHER PUBLICATIONS

Navy Technical Disclosure Bulletin, vol. 6, No. 3, Mar. 1981, pp. 37-39, PROTECTIVE COVER FOR AIRCRAFT RADOMES, by H. Somerfleck.
Mech, Summer 1980 issue, pp. 20-22, NOSE RADOMES WON'T BOTHER YOU ANYMORE, by Norm Amdur and F. A. Hoyt.

Primary Examiner—Caleb Weston
Attorney, Agent, or Firm—R. F. Beers; A. L. Branning; W. R. Henderson

[57] ABSTRACT

A rain erosion resistant protective covering for aircraft having pointed or conical radomes and method of forming the protective covering. The protective covering is a layered material of polyurethane, contact adhesive, and polyethylene which is formed into the desired shape by precutting the material to the shape of the radome, placing the material in a mold, heating the material, and drawing a vacuum between the mold and material to draw the material into the shape of the mold, thus producing a cover having the shape of the mold.

2 Claims, 3 Drawing Figures

METHOD FOR FORMING A PROTECTIVE COVER FOR AIRCRAFT HAVING CONICAL RADOMES

BACKGROUND OF THE INVENTION

Rain erosion of high speed aerodynamic surfaces has been of concern since the introduction of the first high speed, all weather, military aircraft. As aircraft speeds have increased it has become evident that rain drops, dust, dirt, sand and static discharge are capable of totally destroying aircraft radomes, optical windows, leading edges or other aerodynamic surfaces.

Prior attempts to prevent damage to aerodynamic surfaces by such airborne particles are typified by the protective device disclosed in U.S. Pat. No. 3,236,093, to Warner, which illustrates a physical structure displaced ahead of the surface to be protected from damage. The disadvantage of the structure disclosed in Warner is that it impedes the unobstructed forward field of the surface being protected.

Another prior art attempt to protect aerodynamic surfaces from rain and other airborne particles is illustrated in U.S. Pat. No. 3,637,166, to Nicholson et al, which discloses apparatus positioned ahead of the aerodynamic surface to disintegrate rain drops prior to their impact on the aerodynamic surface. Again, the disadvantage of the device disclosed in Nicholson et al is that it obstructs the forward field of view of the surface being protected.

In addition, prior attempts to solve the erosion of aerodynamic surfaces have included painting the surface with polyurethane elastomere which is both hazardous to personnel and time consuming in application.

The protective covering disclosed in the subject invention and the method of forming the protective covering provide a rain erosion resistent surface for aircraft having conical radomes or other variably contoured surfaces while reducing the hazards to personnel and the time consuming processes of applying the protective covering.

SUMMARY OF THE INVENTION

Accordingly, there is provided in the present invention a protective covering for conical or pointed aircraft radomes, antenna, and other variably contoured leading edges or aerodynamic surfaces.

The covering is constructed of a layered material having a layer of polyurethane separated from a layer of polyethylene by an internal layer of contact adhesive. The protective covering is formed into a shape necessary for covering a conical radome or other variably contoured aerodynamic surface by cutting the layered material to the desired shape; placing the material in a mold of the desired shape, heating the material and drawing of a vacuum between the mold and the material so as to draw the material into the shape of the mold and produce a protective covering having the desired shape.

OBJECTS OF THE INVENTION

It is an object of the present invention to provide a protective covering for aircraft having conical or pointed radomes.

A further object of the present invention is to provide a protective covering for aircraft radomes, antenna, and other variably contoured aerodynamic surfaces.

Another object of the present invention is to provide a protective covering for aircraft having pointed radomes which resist erosion due to rain, dust, dirt, sand and static discharge.

A further object of the present invention is to provide a protective covering for aerodynamic surfaces which is durable and easy to apply to aircraft.

Other objects, advantages, and novel features of the present invention will become apparent from the following detailed description of the invention when considered in conjunction with the drawings.

BRIEF DESCRIPTION OF THE DRAWINGS

A more complete appreciation of the invention and many of the attendant advantages thereof will be readily understood by reference to the following detailed description when considered with the accompanying drawings in which like reference numerals designate like parts throughout the figures and wherein.

DESCRIPTION OF THE PREFERRED EMBODIMENT

Figure 1:
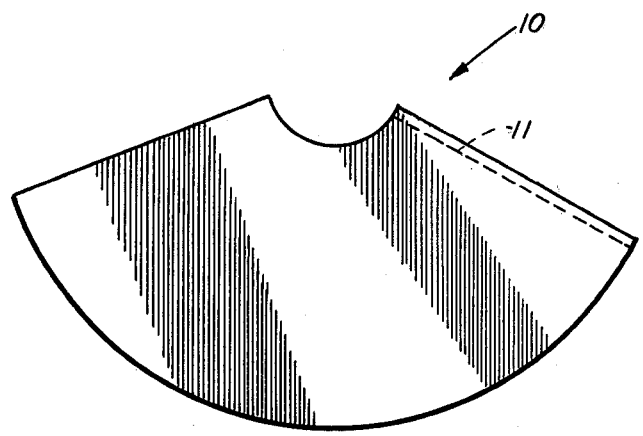
FIG. 1 illustrates a blank of layered material cut in a shape to fit a conical radome.

Referring to FIG. 1, there is illustrated a schematic representation of a blank of layered material 10 which has been precut in the desired shape to fit a given aircraft radome. Blank 10 has been cut, in this case, to form a conical shape which corresponds to the conical shape of an aircraft radome. The blank is cut from a composite of sheet layered material constructed with a first layer of polyurethane which is separated from a layer of polyethylene liner by a layer of contact adhesive. As illustrated in FIG. 1 by dotted line 11, blank 10 is precut so as to overlap on the leading edges and thus bond the blank into a three dimensional conical shape. Although blank 10 is illustrated as having a conical shape, it is to be understood that the shape of blank 10 is to be determined by the shape of the aerodynamic surface to be covered by the protective covering.

Figure 2:
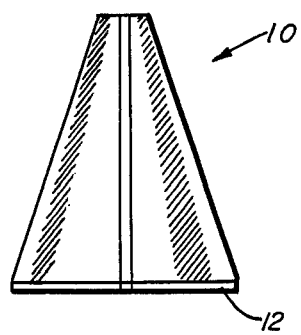
FIG. 2 illustrates the blank of FIG. 1 positioned on a form.

As illustrative in FIG. 2, blank 10 is formed into the three dimensional shape of a cone and positioned on a male form 12. The polyethylene liner of the layered material is removed in area 11 such that the leading edges of blank 10 are bonded together by the contact adhesive already in place or other adhesive (such as polyurethane) before positioning the blank on form 12. Area 11 is bonded with a layer of contact adhesive exposed by the removal of the polyethylene liner, or another suitable adhesive such as epoxy or polyurethane.

Figure 3:
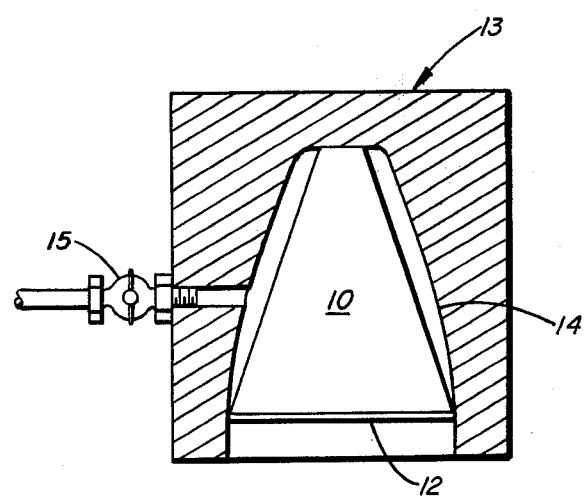
FIG. 3 illustrates the blank of layered material and form positioned in a mold for forming the desired shape of protective covering.

Referring to FIG. 3, there is illustrated a schematic representation of the blank and male form positioned in female mold 13 having an internal shaped cavity 14 which corresponds to the shape of the aerodyanmic surface to be fitted with the protective covering, in this case a conical aircraft radome. Blank 10 is positioned in mold 13 and the mold or the blank is heated to approximately 350° F. or until the layered material of the blank becomes formable.

After heating of the mold, the pressure is reduced in the mold by drawing a vacuum between internal cavity 14 and blank 10 by means of vacuum connection 15. As shown in FIG. 3, male form 12 is inserted in the female mold 13 such that blank 10 touches shaped cavity 14 at both the top and bottom of the cavity so as to facilitate the drawing of a vacuum between blank 10 and shaped cavity 14. Drawing a vaccum in the mold causes the heated material of blank 10 to assume the shape of internal cavity 14.

After blank 10 has been shaped to correspond to the aerodynamic surface by drawing into internal cavity 14, the mold and material are allowed to cool to room temperature while under the vacuum. Premature release of the vacuum in the mold before complete cooling of the blank will result in only a partial recovery of the elastic memory of the material. After forming and cooling of blank 10 into the desired shape the protective covering may be applied to the radome or variably contoured aerodynamic surface by removing or peeling off the polyethylene layer to expose the layer of contact adhesive. The protective covering is then applied to the surface by means of the layer of contact adhesive.

Although the subject invention has been disclosed for shaping a protective covering for a conical radome, it is to be understood that the protective covering and method of forming same can be used for covering any variably contoured aerodynamic surface which is subjected to erosion by rain and atmospheric particles.

It is thus apparent that the disclosed protective covering for conical or pointed aircraft radomes and other leading edges or aerodynamic surfaces provides a means for protecting the surfaces from erosion due to rain, dust, dirt, sand and static discharge. The protective covering is durable, easy to apply, non-hazardous to personnel, and can be shaped to conform to any variably contoured surface.

Many obvious modifications and embodiments of the specific invention other that those set forth above will readily come to mind to one skilled in the art having the benefit of the teachings presented in the foregoing description and the accompanying drawings of the subject invention, and hence it is to be understood that such modifications are included within the scope of the appended claims.

What is claimed as new and desired to be secured by Letters Patent of the United States is:

1. A method of forming a protective covering for pointed radomes on aircraft, comprising:
   forming a sheet of layered polyurethane, adhesive and polyethylene into a cone having an overlapping portion;
   placing the conically formed sheet around a conically shaped male form with the polyethylene facing inwardly;
   removing the polyethylene at the overlapping portion and bonding the polyurethane;
   placing the male form with the conically formed sheet therearound into a female mold having a shape corresponding to the desired shape for aircraft radomes;
   heating the female mold;
   reducing the pressure in the female mold to draw the sheet of layered material into the shape thereof;
   cooling the mold while still under reduced pressure;
   removing the formed protective covering from the female mold; and
   removing the inwardly facing sheet of polyethylene to expose the adhesive prior to applicaion to a radome.

2. A method of forming a protective covering for adherence to a variably contoured aircraft surface, comprising the steps of:
   forming a composite sheet of layered sheet material consisting of polyurethane and polyethylene sheets sandwiching a layer of adhesive therebetween;
   forming the composite sheet about a male form with the polyethylene facing inwardly;
   placing the male form with the composite sheet thereabout into a female mold having a shape contour corresponding to the aircraft surface to be covered;
   heating the female mold and drawing a vacuum thereon for causing the composite sheet to conform thereto;
   cooling the mold, releasing the vacuum, and removing the formed protective covering; and,
   removing the inwardly facing polyethylene sheet to expose the adhesive for fitting over an aircraft surface to provide a protective covering therefor.

* * * * *